United States Patent [19]
Paulse

[11] Patent Number: 6,129,318
[45] Date of Patent: Oct. 10, 2000

[54] ERGONOMIC COMPUTER MOUSE WORKSTATION

[75] Inventor: Michael Herbert Paulse, Vancouver, Canada

[73] Assignee: Or Computer Keyboards Ltd., British Columbia, Canada

[21] Appl. No.: 08/860,913
[22] PCT Filed: Jan. 11, 1996
[86] PCT No.: PCT/CA96/00017
    § 371 Date: Dec. 21, 1999
    § 102(e) Date: Dec. 21, 1999
[87] PCT Pub. No.: WO96/21907
    PCT Pub. Date: Jul. 18, 1996

[51] Int. Cl.$^7$ ........................................... B43L 15/00
[52] U.S. Cl. ........................... 248/118.3; 248/118.5; 400/715
[58] Field of Search .................... 248/118, 118.1, 248/118.3, 118.5, 918; 400/715

[56] References Cited

U.S. PATENT DOCUMENTS

| | | | |
|---|---|---|---|
| 176,010 | 4/1876 | Knapp . | |
| 1,025,476 | 5/1912 | Mellen . | |
| 1,277,169 | 8/1918 | Anderson . | |
| 4,332,263 | 6/1982 | Kitrell | 132/73 |
| 4,482,064 | 11/1984 | Berke et al. | 211/69.1 |
| 4,545,554 | 10/1985 | Latino et al. | 248/118.1 |
| 4,561,183 | 12/1985 | Shores | 33/1 M |
| 4,621,781 | 11/1986 | Springer | 248/118 |
| 4,709,972 | 12/1987 | LaBudde et al. | 312/208 |
| 4,862,165 | 8/1989 | Gart | 341/21 |
| 4,913,390 | 4/1990 | Berke | 248/176 |
| 4,973,176 | 11/1990 | Dietrich | 400/715 |
| 4,976,407 | 12/1990 | Schwartz et al. | 248/118.3 |
| 5,004,196 | 4/1991 | Gross | 248/118.3 |
| 5,029,260 | 7/1991 | Rollason | 235/145 R |
| 5,058,840 | 10/1991 | Moss et al. | 248/118.5 |
| 5,074,511 | 12/1991 | Wilson | 248/346 |
| 5,088,668 | 2/1992 | Grimm | 248/118.3 |

(List continued on next page.)

FOREIGN PATENT DOCUMENTS

| | | |
|---|---|---|
| 3306056 | 9/1984 | Germany . |
| 9209935 | 10/1992 | Germany . |
| WO9406331 | 3/1994 | WIPO . |

OTHER PUBLICATIONS

Patent Cooperation Treaty Publication No. WO 93/13515; Publication Date Jul. 8, 1993; International Application Serial No. PCT/FR92/01236; International Filing Date Dec. 23, 1992; Title—Support for the Arms and Hands of a User of a Keyboard, Drawing, Knitting Instrument or Apparatus.

(List continued on next page.)

*Primary Examiner*—Ramon O. Ramirez

[57] ABSTRACT

An ergonomic computer mouse workstation includes a base operable to rest on a surface defining a reference plane having a normal surface axis extending perpendicular thereto and a platform secured to the base. The platform has a work surface operable to support a computer mouse, the work surface being disposed at an angle to the reference plane, the base being moveable relative to the platform to position the work surface at an angular orientation relative to the reference plane, to provide a slope to the work surface. The ergonomic computer mouse workstation may further include a counterbalance for providing a force to the computer mouse to oppose the tendency of the computer mouse to move down the inclined surface. In addition, there may be provided a moveable hand support including a sliding member operable to rest and slide on the work surface, a heel support connected to the sliding member, for supporting the heel of a user's hand above the work surface and a palm support connected to the sliding member and extending upwardly from the heel support for supporting the palm of the user's hand above the work surface such that a mouse operating space is provided between the palm support and the work surface, the operating space being operable to receive a computer mouse therein. The work surface may be the work surface provided by the platform above or may be a table top or the like.

11 Claims, 12 Drawing Sheets

U.S. PATENT DOCUMENTS

| | | | |
|---|---|---|---|
| 5,125,606 | 6/1992 | Cassano et al. | 248/118 |
| 5,131,614 | 7/1992 | Garcia et al. | 248/118 |
| 5,135,190 | 8/1992 | Wilson | 248/118.1 |
| 5,137,384 | 8/1992 | Spencer et al. | 400/489 |
| 5,158,256 | 10/1992 | Gross | 248/118.3 |
| 5,161,760 | 11/1992 | Terbrack | 248/118 |
| 5,165,630 | 11/1992 | Connor | 248/118.1 |
| 5,193,771 | 3/1993 | Hassel et al. | 248/118 |
| 5,197,699 | 3/1993 | Smith et al. | 248/118 |
| 5,201,485 | 4/1993 | Moss et al. | 248/118 |
| 5,203,527 | 4/1993 | Rubey | 248/118 |
| 5,203,845 | 4/1993 | Moore | 248/118 |
| 5,211,367 | 5/1993 | Musculus | 248/279 |
| 5,219,136 | 6/1993 | Hassel et al. | 248/118 |
| 5,228,655 | 7/1993 | Garcia et al. | 248/118 |
| 5,234,186 | 8/1993 | Powell | 248/118.1 |
| 5,246,191 | 9/1993 | Moss | 248/118.3 |
| 5,265,835 | 11/1993 | Nash | 248/118 |
| 5,281,001 | 1/1994 | Bergsten et al. | 297/411.24 |
| 5,340,067 | 8/1994 | Martin et al. | 248/118.5 |
| 5,340,075 | 8/1994 | Schriner | 248/346 |
| 5,342,006 | 8/1994 | Tice | 248/118 |
| 5,351,897 | 10/1994 | Martin | 244/118 |
| 5,369,805 | 12/1994 | Bergsten et al. | 297/411.35 |
| 5,386,956 | 2/1995 | Hatcher | 248/118 |
| 5,398,896 | 3/1995 | Terbrack | 248/118.5 |
| 5,407,249 | 4/1995 | Bonutti | 297/411.35 |
| 5,465,931 | 11/1995 | MacDonald | 248/118.3 |
| 5,470,036 | 11/1995 | Vu et al. | 248/118.5 |
| 5,472,161 | 12/1995 | Krukovsky | 248/118.5 |
| 5,483,898 | 1/1996 | Seidl | 108/3 |
| 5,487,525 | 1/1996 | Drabezyk et al. | 248/639 |
| 5,490,647 | 2/1996 | Rice | 248/118.1 |
| 5,820,085 | 10/1998 | Paulse et al. | 248/118.5 |
| 5,826,842 | 10/1998 | Paulse et al. | 248/118.1 |

OTHER PUBLICATIONS

IBM Technical Disclosure Bulletin; vol. 34 No. 8; pp. 451–453; "Ergonomic Pad for Workstation Graphic Tablet Puck" (4–Button Cursor); New York, United States; Jan. 1992.

Mouse Arena Assembly Instructions; FORMINCO; copyright 1990; U.S. and Foreign patents and design patents pending.

Patent Cooperation Treaty Publication No. WO/ 96/21907; Publication Date Jul. 18, 1996; International Application Serial No. PCT/CA96/00017; International Filing Date Jan. 11, 1996; Title Ergonomic Computer Mouse Workstation.

Patent Cooperation Treaty Publication No. WO 94/06331; Publication Date Mar. 31, 1994; International Application Serial No. PCT/US93/08369; International Filing Date Sep. 7, 1993; Title—Computer Mouse Tower.

ERGONOMIC COMPUTER MOUSE WORKSTATION

BACKGROUND OF THE INVENTION

This invention relates to ergonomic components for computer mouse usage and more particularly to an ergonomic computer mouse workstation.

The use of computer "mice" is becoming increasingly prevalent in modern computing, however use of a computer mouse can be hazardous to the user. Basic use of a computer mouse on a surface provided by a table, for example, requires positioning the user's hand in a generally horizontal position which can cause the tendons in the hand to lie in strained positions, often resulting in discomfort. Use of the tendons in this position can exacerbate such discomfort and may result in irritations of the carpal tunnel in some users. Changing the height of the table or chair can alleviate some of these problems but it is impractical to expect a user to adjust his table or chair each time a computer mouse is to be used.

Another problem with using a computer mouse on a fixed surface such as a table top is abrasion of the underside of the user's wrist, thumb and fingers on the surface which is encountered when sliding a mouse across a surface. This can result in further discomfort.

U.S. Pat. No. 5,203,845 to Moore discloses a computer mouse support having a fixed, upwardly and sidewardly angled planar mouse support surface and a fixed wrist/palm support portion seeking to alleviate the problem of positioning the hand in strained positions but lacks adjustment means for adjusting the angle of the angled support surface to accommodate different users and table heights and lacks a moveable wrist rest capable of relieving abrasion.

U.S. Pat. No. 5,340,067 to Martin el al., discloses a device for supporting the hand and wrist of a computer mouse user. The device has a receptacle in which the mouse is received. A palm support is disposed behind the mouse and finger rests are provided on opposite sides thereof for the thumb and fingers 2, 3 and 4. However, the user's fingers must be stretched outwardly to reach the mouse buttons and whole hand and/or arm movements must be used to make incremental movements of the mouse. The abrasion problem is addressed but the positioning of the hand and the outstretched fingers can be uncomfortable, in addition to the discomfort caused by whole arm movements.

U.S. Pat. No. 4,973,176 to Dietrich discloses a rest for a mouse user's appendage such as a wrist or forearm. The rest is located behind the mouse and is positioned on the same work surface as the mouse. The rest may be fitted with wheels to facilitate easy movement. U.S. Pat. No. 5,165,630 to Connor discloses a wrist pad secured behind a mouse by VELCRO (TRADEMARK). The pad slides over the work surface with the mouse. U.S. Pat. No. 5,265,835 to Nash discloses a moveable forearm support having a forearm cradle and rollers so that the support can be moved over a surface along with the mouse. With each of these devices entire hand and/or arm movements are required to effect incremental mouse movements, resulting in early fatigue.

U.S. Pat. No. 5,340,075 to Schriner discloses a flat mouse pad with a fixed curved front portion which acts as a wrist rest. The orientation of the mouse is determined by the surface on which the pad is placed. U.S. Pat. No. 5,197,699 to Smith et al., discloses a wrist rest including a mouse support with a detachable wrist rest portion and U.S. Pat. No. 5,228,655 to Garcia discloses a keyboard or mouse support with a fix wrist rest portion. U.S. Pat. No. 5,088,668 to Grimm discloses a wrist rest having a generally cylindrical sector base member and a generally cylindrical support member which are locked together to extend through an arc. The radial height of the arc off of the support surface is adjustable by changing the locked position of the two cylindrical sectors but the device remains fixed relative to the surface upon which it is used. Each of these devices can be abrasive to the user's wrist and/or fingers.

U.S. Pat. Nos. 5,246,191 and 5,201,485 to Moss et al., disclose an assembly platen on which a mouse pad can be positioned. An arm rest is adjustably connected to the platen and has a cradle for supporting the forearm but provides no reorientation or support for the wrist.

U.S. Pat. No. 5,193,771 to Hassel et al., discloses a wrist support securable directly to the user's wrist by a wrist band. The support extends upward to support the user's palm in use but the weight of the wrist is not supported.

The prior art appears to indicate that the problems involved in using a mouse have been recognized and addressed in the past, however, each prior art device has deficiencies in one aspect or another. The present invention simultaneously addresses the problems outlined above.

SUMMARY OF THE INVENTION

An ergonomic computer mouse workstation includes a base operable to rest on a surface defining a reference plane having a normal surface axis extending perpendicular thereto and a platform secured to the base. The platform has a work surface operable to support a computer mouse, the work surface being disposed at an angle to the reference plane, the base being moveable relative to the platform to position the work surface at an angular orientation relative to the reference plane, to provide a slope to the work surface.

Preferably, the base is rotatable relative to the platform such that a normal axis extending perpendicular to the work surface revolves around the normal surface axis as the base is rotated such that the work surface acquires varying degrees of longitudinal and transverse inclination, or slope.

Preferably, the apparatus includes a rotation limiter for limiting rotational movement of the base within a movement range.

Preferably, the apparatus includes a frictional member operating between the platform and the base to resist relative rotation between the base and the platform such that relative force greater than a predefined limit is required to be applied between the platform and the base to cause relative movement therebetween.

Preferably, the apparatus includes a mouse tether secured to the platform and operable to support at least a portion of a cable connected to the mouse at a point in a plane above the working plane.

In accordance with another aspect of the invention, the ergonomic computer mouse workstation further includes a counterbalance for providing a force to the computer mouse to oppose the tendency of the computer mouse to move down the inclined surface.

Preferably, the counterbalance includes an arm having a first portion securable to the computer mouse and a second portion secured to the platform for pivotal and linear movement relative thereto and preferably the force provided by the counter balance is adjustable by the user.

Preferably, the apparatus further includes a wrist support on the platform, the counterbalance being connected to the wrist support, the wrist support being moveable relative to the platform, movement of the wrist support being effected by the user such that the user's wrist is supported by the wrist support and such that the wrist support is operable to move along with the computer mouse during use to support the user's wrist during full arm movements of the user.

In accordance with another aspect of the invention, there is provided a moveable hand support including a sliding member operable to rest and slide on a work surface, a heel support connected to the sliding member, for supporting the heel of a user's hand above the work surface and a palm support connected to the sliding member and extending upwardly from the heel support for supporting the palm of the user's hand above the work surface such that a mouse operating space is provided between the palm support and the work surface the operating space being operable to receive a computer mouse therein. The work surface my be the work surface provided by the platform above or may be a table top or the like.

Preferably, the palm support is dimensioned to permit the user's fingers to extend into the mouse operating space to enable the fingers of the user to grip the computer mouse.

Preferably, the palm support is operable to be positioned at various distances relative to the heel support.

Preferably, the apparatus includes a lock member secured to the sliding member, the lock member having retaining tabs for securing the palm support thereto in sliding engagement to permit the distance of the palm support from the heel support to be adjusted to suit the user, the lock member cooperating with the palm support to lock the palm support at the desired distance.

Preferably, the lock member is adjustably secured to the sliding member to provide adjustment of the pitch of the user's hand when resting on the hand support.

Preferably, the sliding member includes a member having first and second spaced apart leg portions and a main body portion, the first and second leg portions generally extending on opposite sides of the mouse operating space to prevent the sliding member from tipping due to the weight of the user's hand.

Preferably, the support member has skids on the first and second leg portions respectively to render the support member generally freely slidable over the work surface.

Preferably, the apparatus includes a thumb rest for supporting a user's thumb during operation of the mouse, the thumb rest being moveable relative to the sliding member.

Preferably, the thumb rest provides an unobstructed space into which at least a portion of the user's thumb can extend to obtain tactile feedback from the mouse.

In accordance with another aspect of the invention, there is provided an ergonomic computer mouse workstation including a base operable to rest on a surface defining a reference plane having a normal surface axis extending perpendicular thereto, a platform secured to the base, the platform having a work surface operable to support a computer mouse, the work surface being disposed at an angle to the reference plane, the base being moveable relative to the platform to position the work surface at an angular orientation relative to the reference plane, to provide a slope to the work surface and a moveable hand support operable to rest on and be moved about on the work surface. Preferably, the moveable hand support includes a heel support for supporting the heel of a user's hand, a palm support connected to the heel support and extending upwardly therefrom, for supporting the palm of the user's hand above the work surface such that a mouse operating space is provided between the palm support and the work surface, the operating space being operable to receive a computer mouse therein and a counterbalance mechanism connectable to the computer mouse for providing a force to the computer mouse to oppose the tendency of the computer mouse to move down the work surface when the work surface is sloped.

Preferably, the palm support member is adjustable in distance from the heel support.

Preferably, the palm support is lockable at a desired distance from the heel support.

Preferably, the moveable hand support is adjustable in pitch relative to the work surface.

Preferably, the counterbalance mechanism is user adjustable to permit the user to cause the counterbalance mechanism provide a desired amount of counterbalance torque to the mouse to suit the slope of the work surface and the weight of the mouse.

In accordance with another aspect of the invention, there is provided a moveable hand support which includes a sliding member operable to rest and slide on a work surface. The sliding member has first and second opposite side portions and a main body portion. The hand support has first and second support posts which are connected to the respective first and second opposite side portions of the sliding member. The hand support further has a heel support, having first and second opposite side portions and a main body portion, the first and second side portions having respective portions connectable to the first and second support posts respectively at various distances from the sliding member. A connector is pivotally connected between the main body portion of the heel support and the main body portion of the sliding member, whereby the respective portions of the first and second side portions of the heel support and the connector cooperate to position the heel support spaced above the sliding member such that a space is formed between the sliding member and the heel support, the space being operable to receive a portion of a conventional computer keyboard therein and whereby the respective portions may be connected to the first and second support posts respectively, at different distances from the sliding member to impart side-to-side pitch adjustment of the heel support relative to the sliding member.

Preferably, the apparatus further includes a plurality of receptacles disposed in the first and second support posts for receiving the respective portions of the heel support, each of the receptacles being disposed at a different distance from the sliding member.

Preferably, the heel support includes first and second tabs disposed on the first and second opposite side portions of the heel support, respectively, the first and second tabs being operable to be received in respective receptacles in the first and second support posts. The first tab is disposed in a receptacle in the first support post at a first distance from the sliding member and the second tab is disposed in a receptacle in the second support post at a second distance from the sliding member.

Preferably, the heel support has a forward edge and a rearward edge and the first and second support posts are disposed on the sliding member in a position such that the space is formed between the forward edge of the heel support and the sliding member.

Preferably, the sliding member and the heel support have respective rear portions and the connector includes a screw-threaded portion on the sliding member and a screw member having a captive portion pivotally connected to the heel support and a threaded portion operable to engage with the screw threaded portion on the sliding member, such that rotation of the screw member causes the heel support rear portion to move toward or away from the sliding member rear portion thereby adjusting the fore-aft pitch of the heel support relative to the sliding member.

Preferably, the apparatus includes a palm support connected to the sliding member and extending upwardly above the heel support and operable to be positioned at various distances relative to the heel support by a lock member secured to the sliding member, the lock member having retaining tabs for securing the palm support thereto in sliding engagement to permit adjustment of the distance between the palm support and the heel support to suit the user. The lock member cooperates with the palm support to lock the palm support at a desired distance. The palm support is designed to support the palm of the user's hand above the work surface such that a mouse operating space is provided between the palm support and the work surface, receiving a computer mouse therein. The palm support is dimensioned to permit the user's fingers to extend into the mouse operating space to enable the fingers of the user to grip the computer mouse.

Preferably, the sliding member has first and second leg portions generally extending on opposite sides of the mouse operating space to prevent the sliding member from tipping due to the weight of the user's hand.

Preferably, the heel support has a forward edge and a rearward edge and the first and second support posts are disposed on the sliding member in a position such that a generally planar space is formed between at least portions of the heel support and the sliding member.

Preferably, the apparatus includes a plurality of receptacles disposed in the first and second support posts for receiving the respective portions of the heel support, each of the receptacles being disposed at a different distance from the sliding member.

Preferably, the heel support includes first and second tabs disposed on the first and second opposite side portions of the heel support, respectively, the first tab is disposed in a receptacle in the first support post at a first distance from the sliding member and the second tab is disposed in a receptacle in the second support post at a second distance from the sliding member.

In accordance with another aspect of the invention, there is provided a sliding member operable to rest and slide on a work surface. A heel support is connected to the sliding member, for supporting the heel of a user's hand above the work surface. A palm support is connected to the sliding member and extending upwardly from the heel support for supporting the palm of the user's hand above the work surface such that a mouse operating space is provided between the palm support and the work surface, the mouse operating space being operable to receive a computer mouse therein. The palm support is operable to be positioned at various distances relative to the heel support by a lock member secured to the sliding member, the lock member having retaining tabs for securing the palm support thereto in sliding engagement to permit the distance of the palm support from the heel support to be adjusted to suit the user. The lock member cooperates with the palm support to lock the palm support at a desired distance.

BRIEF DESCRIPTION OF THE DRAWINGS

In drawings which illustrate embodiments of the invention.

DETAILED DESCRIPTION

FIG. 1

Figure 1:
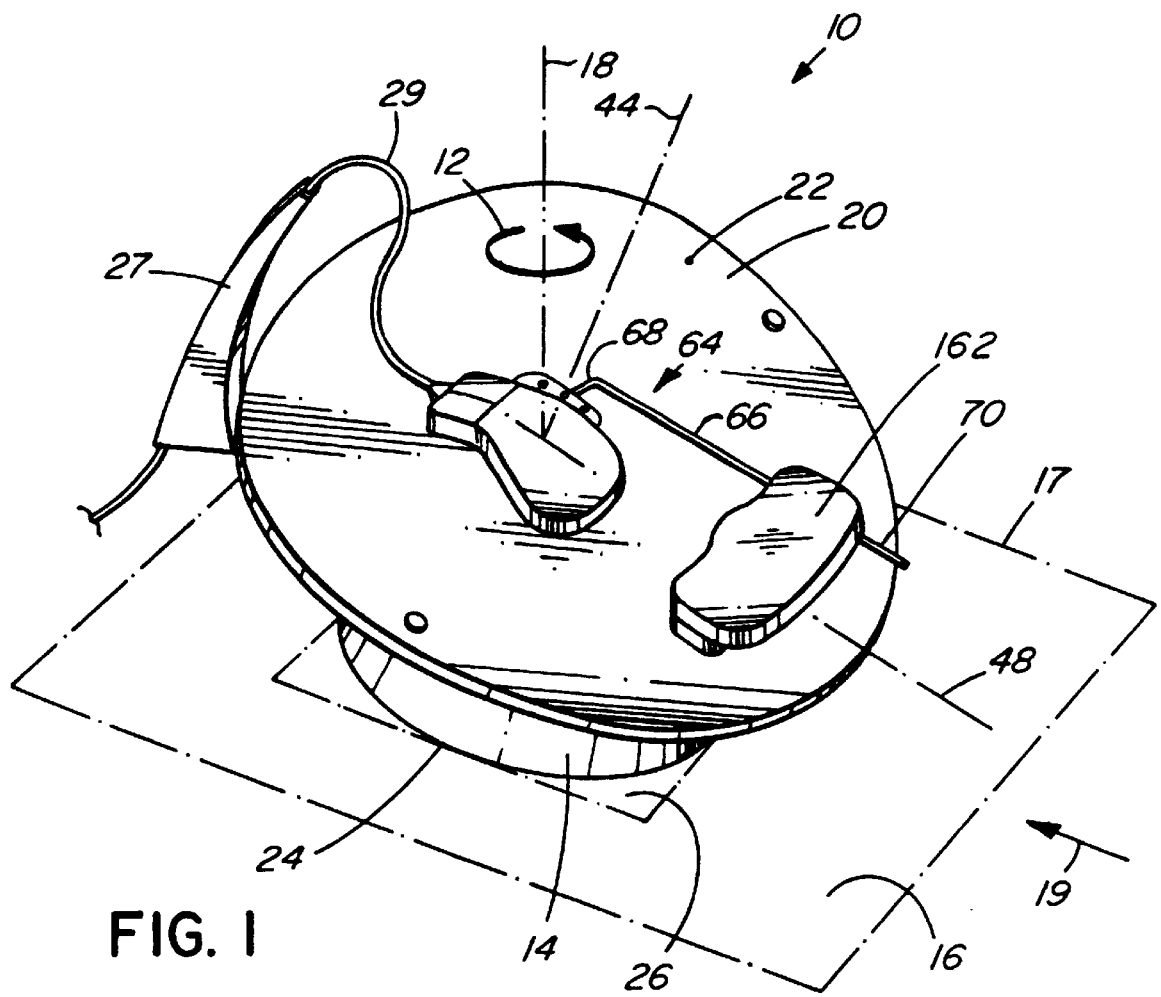
FIG. 1 is a perspective view of an apparatus according to a first embodiment of the invention.

Referring to FIG. 1, an apparatus according to a first embodiment of the invention is shown generally at 10. The apparatus acts as an ergonomic computer mouse workstation upon which a computer mouse 12 is operated. The apparatus includes a base 14 operable to rest on a surface 16 such as provided by a table top or the like. The surface defines a reference plane 17 having a normal surface axis 18 extending perpendicular thereto.

To the base 14 is secured a platform 20 having a work surface 22 operable to support the computer mouse 12. It is a feature of this invention that the work surface 22 is disposed at an angle to the reference plane 17 and that the base 14 is rotatably moveable relative to the platform 20 to position the work surface 22 at an angular orientation relative to the reference plane 17, to provide a slope to said work surface.

In this embodiment, the base 14 is truncated conical in shape, having a flat bottom edge with a flat bottom surface 24 lying in a plane 26 and operable to rest on the surface 16.

FIG. 2

Figure 2:
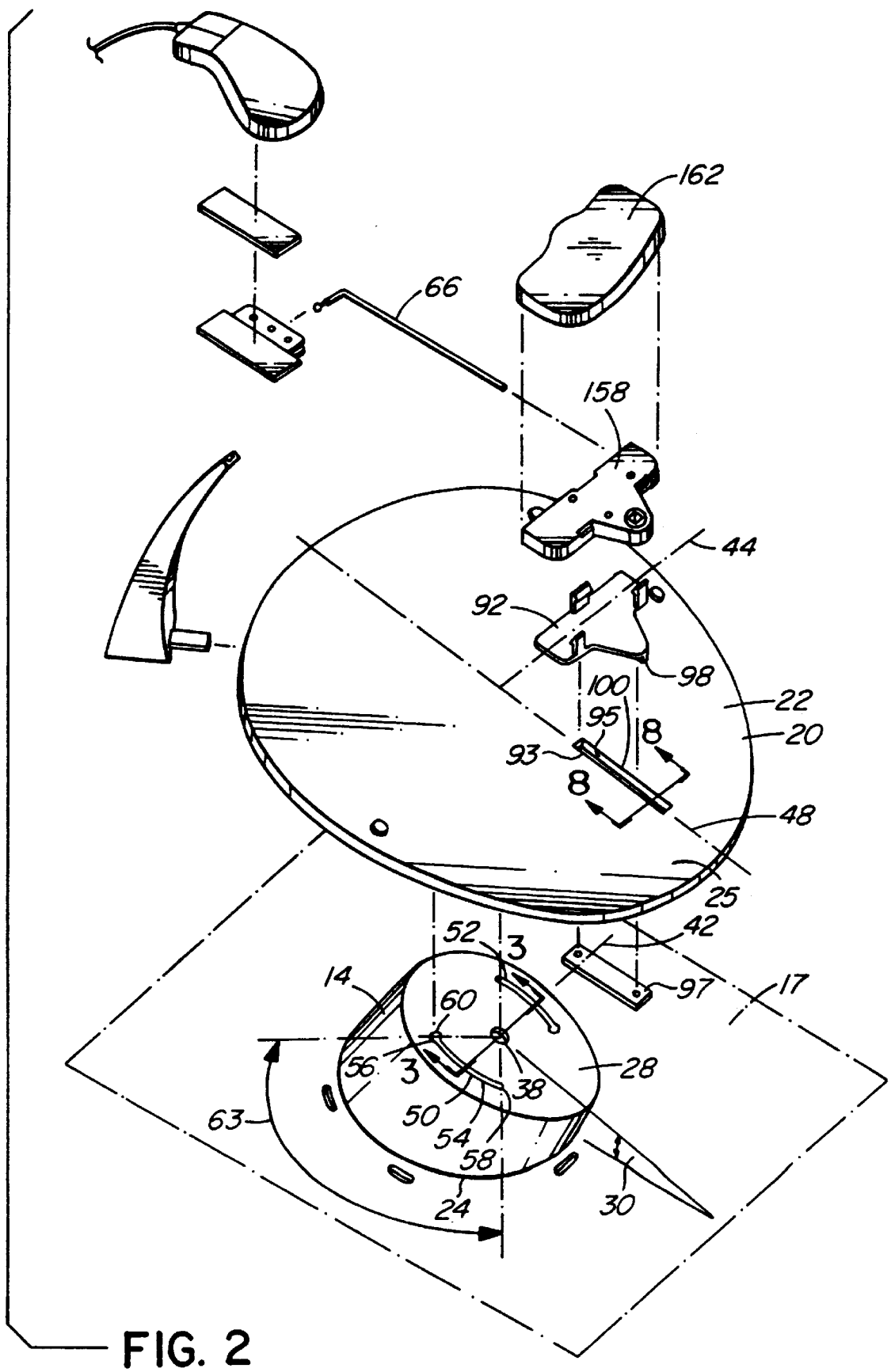
FIG. 2 is an exploded perspective view of the apparatus of FIG. 1.

Referring to FIG. 2, the base 14 also has a flat support surface 28 disposed at an angle to the plane 26 of the flat bottom edge surface 24 and hence disposed at an angle 30 to the reference plane 17, when in use, for supporting the platform 20 at an angle to the reference plane 17. Preferably angle 30 is between 12 and 18 degrees. In this embodiment the base has a truncated conical shape, truncated by a plane intersecting the axis of the cone at an angle, the plane being coincident with the flat support surface.

FIG. 3

Figure 3:
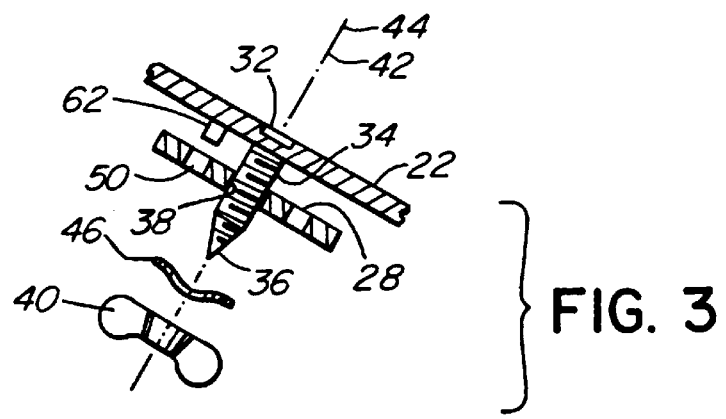
FIG. 3 is a fragmented cross-sectional view of a platform and base according to the embodiment of FIG. 1, taken along lines 3—3 of FIG. 2.

Referring to FIG. 3, the platform 20 is secured to the base 14 by a pivot pin 32 secured to the platform 20. The pivot pin 32 has a smooth shank portion 34 and a threaded end portion 36 which are received in a complementary shaped opening 38 in the support surface 28 such that the smooth shank portion 34 contacts the opening 38 while the threaded end portion 36 extends through the support surface 28 and is operable to receive a wing nut 40 from beneath the support surface to permit easy assembly and disassembly of the apparatus. The opening 38 has an axis 42 disposed perpendicular to the support surface 28 and the opening acts as a bearing for guiding rotation of the smooth shank portion 34 about the axis 42.

In effect therefore, the pivot pin extends perpendicularly through the support surface such that the platform 20 is rotatably mounted on the base 14 such that a normal axis 44 extending perpendicular to the work surface 22 is coincident with the axis 42 of the opening 38. Hence, the platform 20 and base 14 are rotatable relative to each other.

In this embodiment, a spring washer 46 is installed on the pin 32 between the support surface 28 and the wing nut 40 such that the spring washer 46 is slightly compressed with sufficient tightening of the wing nut 40 such that the washer acts as a frictional member operating between the platform 20 and the base 14 to resist relative rotation between the base and the platform such that relative force greater than a predefined limit is required to be applied between the platform 20 and the base 14 to cause relative movement therebetween. The wing nut 40 is tightened sufficiently to cause the platform to remain at a desired angular orientation, or slope relative to the base when the apparatus is in use.

Referring back to FIG. 1, it is preferable to think of the base 14 as being rotatable relative to the platform 20 since the platform is normally kept in a general orientation in which a longitudinal axis 48 thereof is generally or slightly off-parallel with the user's forearm. The base 14 is rotatable relative to the platform 20 such that the normal axis 44 extending perpendicular to the work surface 22 is disposed at an angle to, and revolves around the normal surface axis 18 as the base is rotated such that the work surface 22 acquires varying degrees of longitudinal and transverse inclination, or slope.

Figure 4:
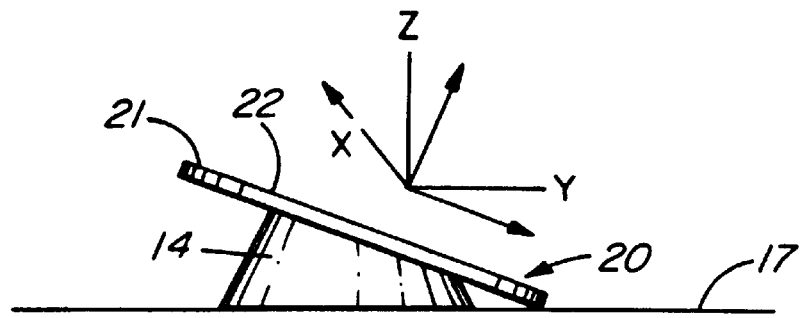
FIG. 4 is an end view of the apparatus of FIG. 1, showing transverse inclination.
Figure 5:
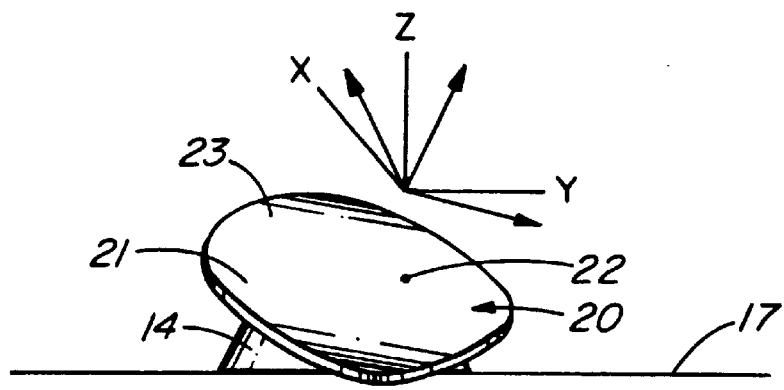
FIG. 5 is an end view of the apparatus of FIG. 1, showing transverse and longitudinal inclination toward a forward end thereof.
Figure 6:
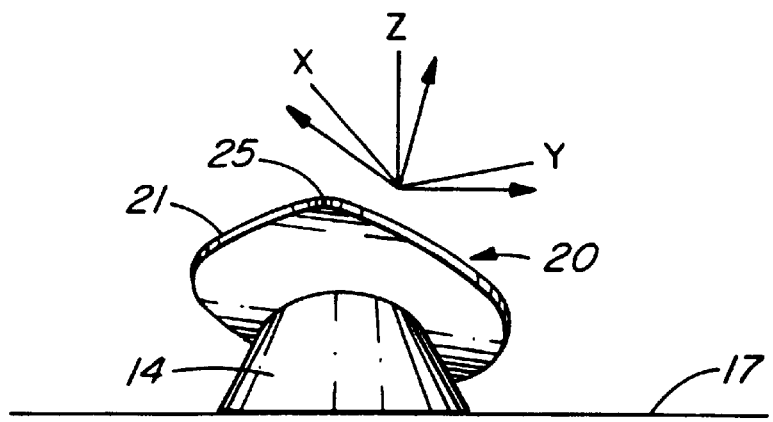
FIG. 6 is an end view of the apparatus of FIG. 1, showing transverse and longitudinal inclination toward an aft end thereof.

Examples of this inclination are shown in FIGS. 4, 5 and 6, each of which are end elevations, depicting the apparatus as seen by a user looking in the direction of arrow 19 shown in FIG. 1.

FIG. 4

In FIG. 4 platform 20 and base 14 are positioned such that the platform 20 has only transverse inclination relative to the reference plane 17, the inclination being upward toward a left-hand side 21 of the platform. This orientation is suitable for a right-handed user where the apparatus is positioned coincident with the natural position of the user's hand, the opposite inclination (not shown) (left side down) being suitable for a left handed user. The natural position of the user's hand is determined by the position of the user. For example, the natural position of the user's hand when sitting in a chair is different from the natural position caused when the user is standing.

FIG. 5

In FIG. 5 platform 20 and base 14 are positioned such that the platform 20 has longitudinal and transverse inclination relative to the reference plane 17, the longitudinal inclination being upward toward a forward end 23 of the platform and the transverse inclination being upward toward the left-hand side 21. This would be the orientation preferred by a right-handed user where the apparatus is located higher than the natural position of the user's hand.

FIG. 6

In FIG. 6 platform 20 and base 14 are positioned such that the platform 20 has longitudinal and transverse inclination relative to the reference plane 17, this time the longitudinal inclination being upward toward an aft end 25 of the platform and the transverse inclination being upward toward the left-hand side 21. This would be the orientation preferred by a right-handed user where the apparatus is located lower than the natural position of the user's hand.

Referring back to FIG. 2, in this embodiment, the apparatus further includes a rotation limiter for limiting rotational movement of the base relative to the platform within a movement range. The rotation limiter includes first and second arcuate, diametrically oppositely disposed openings 50 and 52 formed in the support surface 28. The openings 50 and 52 are similar and therefore only one will be described.

The first opening 50 has a generally uniformly shaped portion 54 terminated in an enlarged portion 56. The uniformly shaped portion has a first end stop wall 58 and the enlarged portion has a second end stop wall 60.

Referring to FIG. 3, a stop pin 62 is installed in the platform 20 such that a portion thereof extends toward the support surface when the apparatus is in use, such that the stop pin is received in the first opening 50. Referring back to FIG. 2, the enlarged portion 56 permits the stop pin 62 to be easily inserted in the first opening 50 during assembly of the apparatus.

The first and second spaced apart stop walls 58 and 60 interfere with the stop pin 62 to confine movement of the stop pin 62 between the first and second walls, thereby confining movement of the base relative to the platform to an angle 63 of approximately 60 degrees which provides a suitable range of adjustment of longitudinal and transverse inclination for right handed operation of a computer mouse, in the embodiment shown.

The second opening 52 is disposed on the support surface 28 diametrically opposite the first opening 50 and permits the platform 20 to be installed on the base 14 in an orientation suitable for left handed operation (not shown) of the computer mouse.

Referring back to FIG. 1, the apparatus further includes a mouse tether 27 including a tether member extending generally outwardly from the work surface (working plane). The tether member is secured to the platform 20 and is operable to support at least a portion of a cable 29 connected to the mouse at a point in a plane above the work surface 22.

Operation

The apparatus according to the first embodiment is used by placing the platform on the base in the desired orientation for left or right-handed operation, the right handed configuration being shown in FIG. 1. The platform is then rotated relative to the base until the work surface 22 acquires the desired longitudinal and transverse inclination or slope. The wing nut 40 shown in FIG. 3 is then tightened to fix the platform in the selected inclination. A computer mouse may then be set on the work surface and moved about in the conventional manner.

Second Embodiment

A second embodiment of the invention includes all aspects of the first embodiment described above and, referring back to FIG. 1, further includes a counterbalance 64 for providing a counterbalancing force to the computer mouse 12 to oppose its tendency to move transversely down the inclined work surface 22. This is provided by an arm 66 having a first portion 68 securable to the computer mouse and a second end portion 70 ultimately secured to the platform 20 for pivotal and linear movement relative thereto.

FIG. 7

Figure 7:
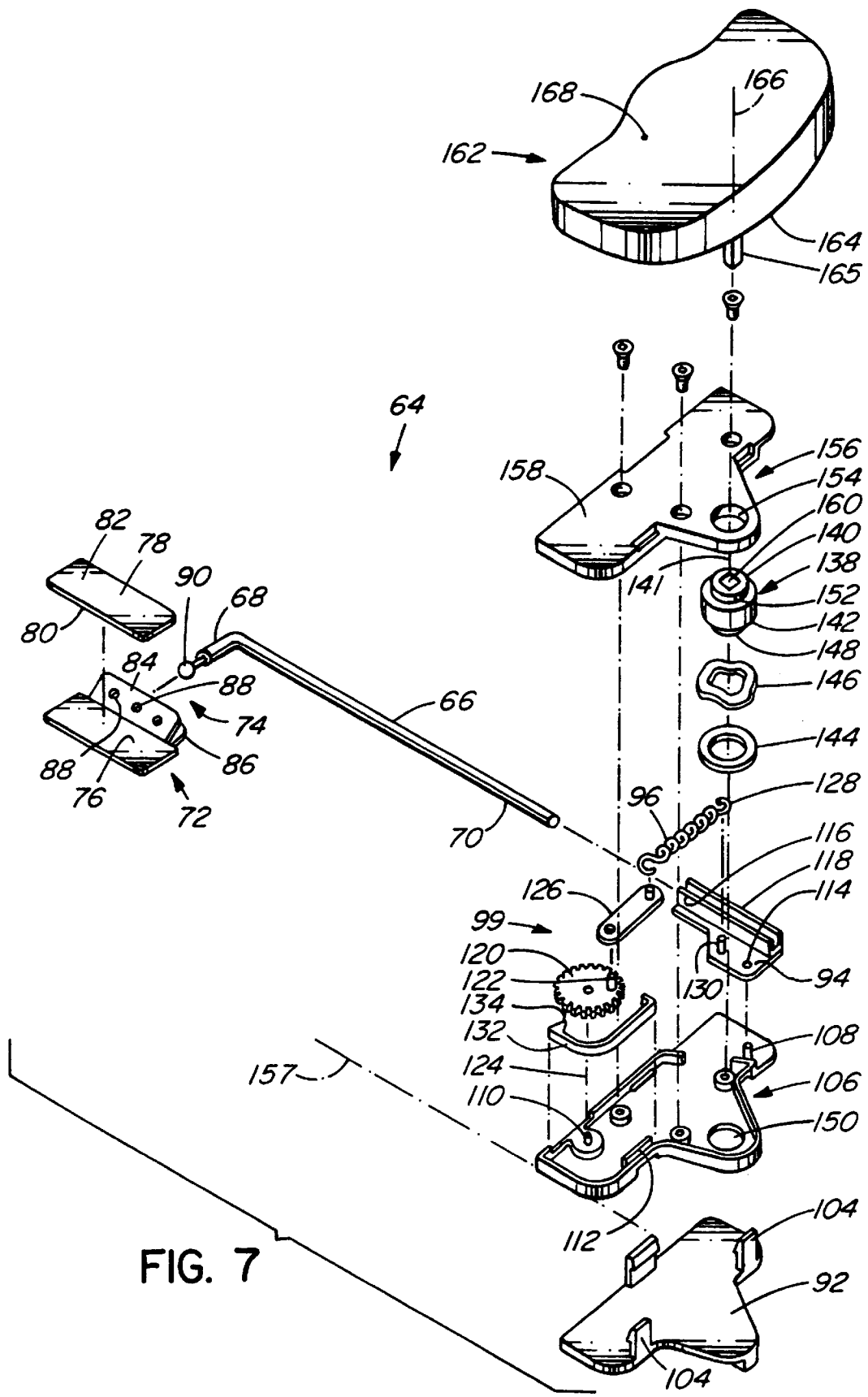
FIG. 7 is an exploded perspective view of a mouse counterbalance according to a second embodiment of the invention.

Referring to FIG. 7, the first portion of the arm 66 includes a mouse interface member 72 securable to the mouse (not shown) and a connector 74 for connecting the mouse interface member 72 to the arm 66 while permitting movement of the mouse interface member 72 relative to the arm 66. In this embodiment the mouse interface member 72 includes a flat plate 76 and a strip of double sided tape 78, a first side 80 of which is secured to the flat plate 76 and a second side 82 of which is securable to an underside of the computer mouse (not shown). The computer mouse is thus fixed to the flat plate 76, in this manner.

The connector 74 includes first and second diverging plate portions 84 and 86 connected to the flat plate 76, the plate portions having aligned circular openings 88 therein. The connector further includes a ball 90 secured to the first portion 68 of the arm 66, the ball 90 being received between the first and second diverging plate portions 84, 86 such that respective portions of the ball 90 are received in respective openings 88 therein. Effectively, the ball 90 and plate portions 84, 86 cooperate to provide a ball and socket joint which permits the mouse (not shown) to be secured to the arm 66 but moveable rotationally, in any spherical direction relative thereto. Thus, the arm 66 does not interfere with the movement of the computer mouse.

Figure 19:
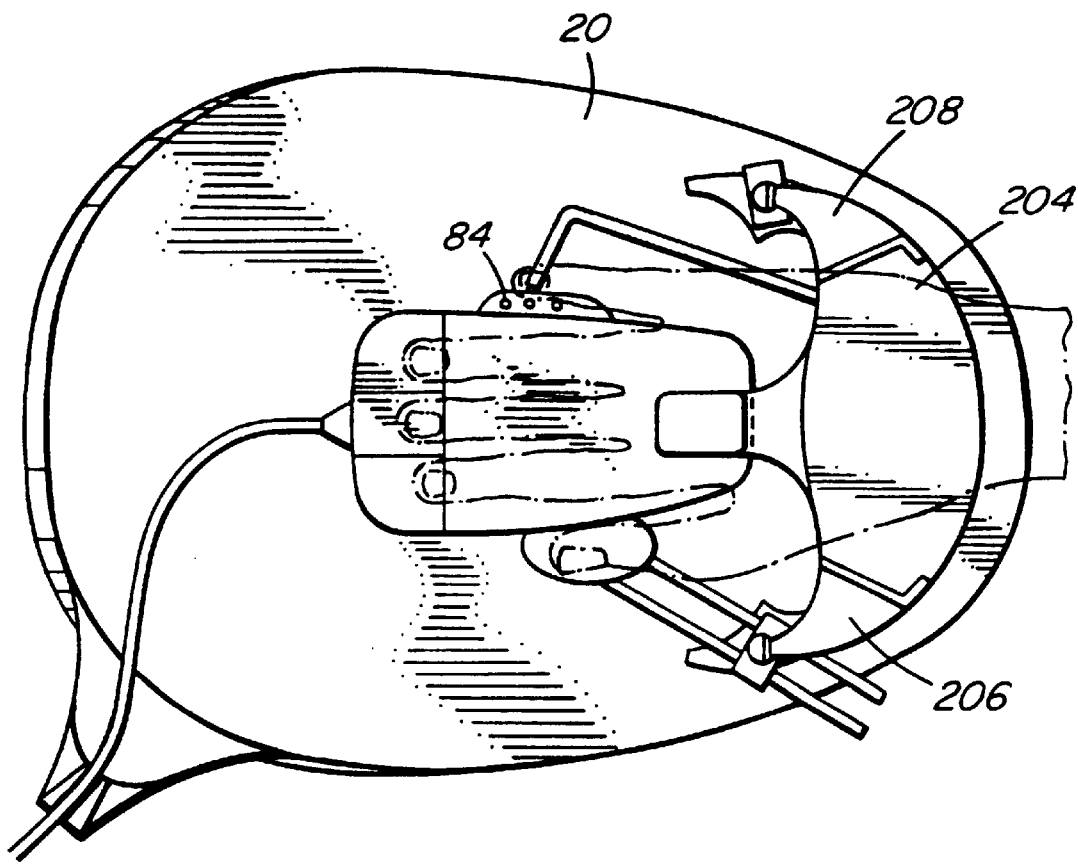
FIG. 19 is a top view of the apparatus according to the third embodiment shown in use on a platform according to the first embodiment.

The plate portions 84 and 86 also act as pinky finger rests when the apparatus is in use as will be appreciated upon brief reference to FIG. 19.

Referring back to FIG. 7, the counterbalance 64 further includes a support member 92 secured to the platform (not shown), a guide member 94 pivotally connected to the support member 92 for receiving, holding and guiding the second end portion 70 of the arm 66 in linear movement relative thereto and includes a spring 96 connected between the guide member 94 and the support member 92 through a spring tensioning mechanism 99 for imposing a counterbalancing torque on the arm 66.

Referring back to FIG. 2, the support member 92 is secured to the platform 20 by a generally rectangular projection 98 which is received in an elongated opening in the form of a generally rectangular slot 100 disposed longitudinally in the platform at a rearward end portion 25 thereof which acts as a guide portion of the platform.

FIG. 8

Figure 8:
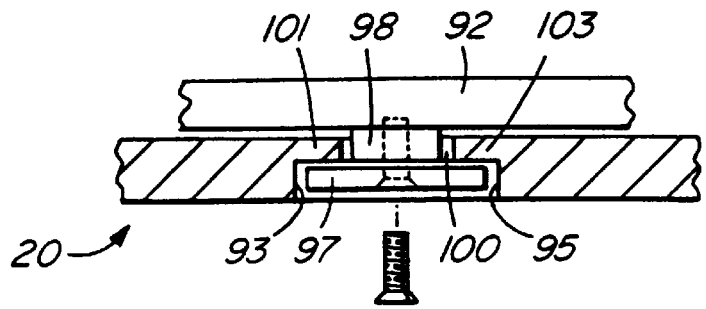
FIG. 8 is a fragmented, cross-sectional view of the platform and a support member according to the second embodiment.

Referring to FIG. 8, the platform has first and second stop portions 93 and 95 on opposite sides of the slot, for receiving a retainer 97 consisting of a flat planar member which is secured to the rectangular projection 98 such that portions 101 and 103 of the platform, on opposite sides of the slot are received between the platform and the retainer 97. The slot 100 and rectangular projection 98 guide the support member 92 to permit it to slide linearly longitudinally relative to the platform and the range of sliding movement is defined by the length of the rectangular slot 100. The support member 92 is thus linearly slidably secured to the platform 20.

Referring back to FIG. 7, the support member 92 has a plurality of projecting tabs 104 which are operable to hold a mounting member 106 having a pivot pin 108, a spindle 110 and a pawl holder 112.

The guide member 94 has an opening 114 for receiving the pivot pin 108 on the mounting member 106 to connect thereto and has first and second upstanding spaced apart wall portions 116 and 118 between which the second end portion 70 of the arm 66 is received and held. The first and second upstanding wall portions 116 and 118 act to guide the arm 66 in linear movement relative to the guide member 94 and hence relative to the support member 92, and the pivot pin 108 and cooperating opening 114 in the guide member 94 act to guide the arm 66 in rotational movement relative to the support member 92.

The spring tensioning mechanism includes a circumferentially toothed wheel 120 having a pin 122 extending parallel to but spaced apart from the wheel's axis of rotation 124, mounted on the spindle 110. A link 126 is connected to the pin 122 and is further connected to the extension spring 96 which has an end portion 128 connected to a second pin 130 on the guide member 94. The lengths of the link 126 and spring 96 are chosen such that rotation of the toothed wheel 120 moves the pin 122 toward or away from the guide member 94, thereby extending or relaxing the spring 96.

A pawl member 132 is installed in the pawl holder 112 and has a pawl 134 which is biased against the toothed wheel 120 such that it is received between the teeth thereof to prevent rotation of the wheel under the influence of the spring 96 and generally to resist rotation thereof. Hence, the toothed wheel 120 may only be rotated by overcoming the pawl. Rotation of the wheel sufficiently extends the spring 96 or adjusts the extension of the spring to place the arm 66 under suitable torque about the pin 108. Hence, these components act as a spring tensioning mechanism which provides suitable torque to the arm 66. "Suitable torque" is the counterbalancing torque required on the arm 66 to prevent the mouse (not shown) from rolling down the incline on the platform (not shown) but not so much torque as to cause the mouse to be moved up the incline. Adjustability of the counterbalancing torque as provided by the toothed wheel 120, spring 96 and pawl 134 of this embodiment is desirable as different amounts of counterbalancing torque are required, depending upon the amount of inclination or slope the user has selected for the platform, the coefficient of friction between the mouse and the platform and depending upon the weight of the mouse.

At least a portion of the toothed wheel projects from the mounting member for access by a user of the device to facilitate adjustment of the counterbalancing torque without disassembly of the apparatus.

Still referring to FIG. 7, in this embodiment, the apparatus further includes a wrist support member 162 secured to the support member 92. To facilitate this, a bearing 138 having a rotatable spindle 140 with a spindle axis 141 is secured to the mounting member 106. The bearing 138 has a first shaft portion 142 upon which is installed a flat washer 144 and a spring washer 146. A first portion 148 of the first shaft portion 142 is received in an opening 150 in the mounting member 106 and is thereby prevented from radial movement. A second shaft portion 152 of the bearing is received in a corresponding opening 154 in a cover plate 156 which is secured to the mounting member 106 so as to compress the spring washer 146 to frictionally hold the bearing 138 in place relative to the mounting member 106. Thus, the wrist support is pivotally secured to the support member for rotation in a plane generally parallel to the work surface 22 held in the last position set by the user, regardless of the slope of the platform.

The cover plate 156 and mounting member 106 have respective smooth, flat exterior surfaces, only one of which is shown at 158. The rotatable spindle 140 is accessible through the openings 150 and 154 and the spindle 140 has a rectangularly shaped opening 160 coaxial therewith, which is accessible through the openings 150 and 154 when the cover plate 156 is installed. When the cover plate 156 is installed on the mounting member 106, the entire assembly so formed can be snapped onto the support member in the orientation shown, where the arm 66 extends from a right-hand side of the assembly, or the entire assembly may be rotated about axis 157, through 180 degrees, and then snapped onto the support member 92 in which case the entire assembly is oriented upside-down (not shown) relative to the orientation shown. In the upside-down orientation, the arm 66 extends from a left hand side of the assembly. The symmetry of the assembly and support member 92 allows the assembly to be snapped onto the support member 92 with the arm on the left or right hand side. This enables the assembly to be oriented relative to the base for left or right handed operation.

The wrist support member 162 has a smooth flat under surface 164 which is operable to slide on the smooth surface 158 of the cover plate 156 or mounting member 106. A projection 165 having a rectangular cross section and a rotational axis 166 projects perpendicularly from the smooth flat surface 164 of the wrist support member 162 and is received in the rectangularly shaped opening 160 in the spindle 140. Hence, the wrist support member 162 is operable to rotate the spindle 140 and hence is rotatable about the spindle axis 141. During rotation of the wrist support member 162, the smooth surfaces 158 and 164 on the wrist support member and the cover plate (or mounting member) respectively contact and slide on each other to maintain the wrist support member 162 in a plane generally parallel with the platform or surface on which the apparatus is used (not shown) when in use.

The wrist support member 162 has an exterior surface 168 which is contoured to generally conform to the general shape of the heel portion of a user's hand. Thus, the user can comfortably rest his hand on the wrist support and can rotate or move his hand forward or backward and hence correspondingly move the wrist support, without lifting the hand. Hence, rubbing of the heel of the hand on the wrist support is virtually eliminated.

Operation

The entire apparatus according to the second embodiment is seen ready for use in FIG. 1. Assuming the user has suitably adjusted the inclination or slope of the platform relative to the base according to the first embodiment, the user merely places the heel portion of his hand on the wrist support member 162 and grasps the mouse. Fine movement of the mouse is then effected by movement of the fingers and coarse movement of the mouse is effected by whole hand movements linearly and rotationally.

Third Embodiment

FIG. 9

Figure 9:
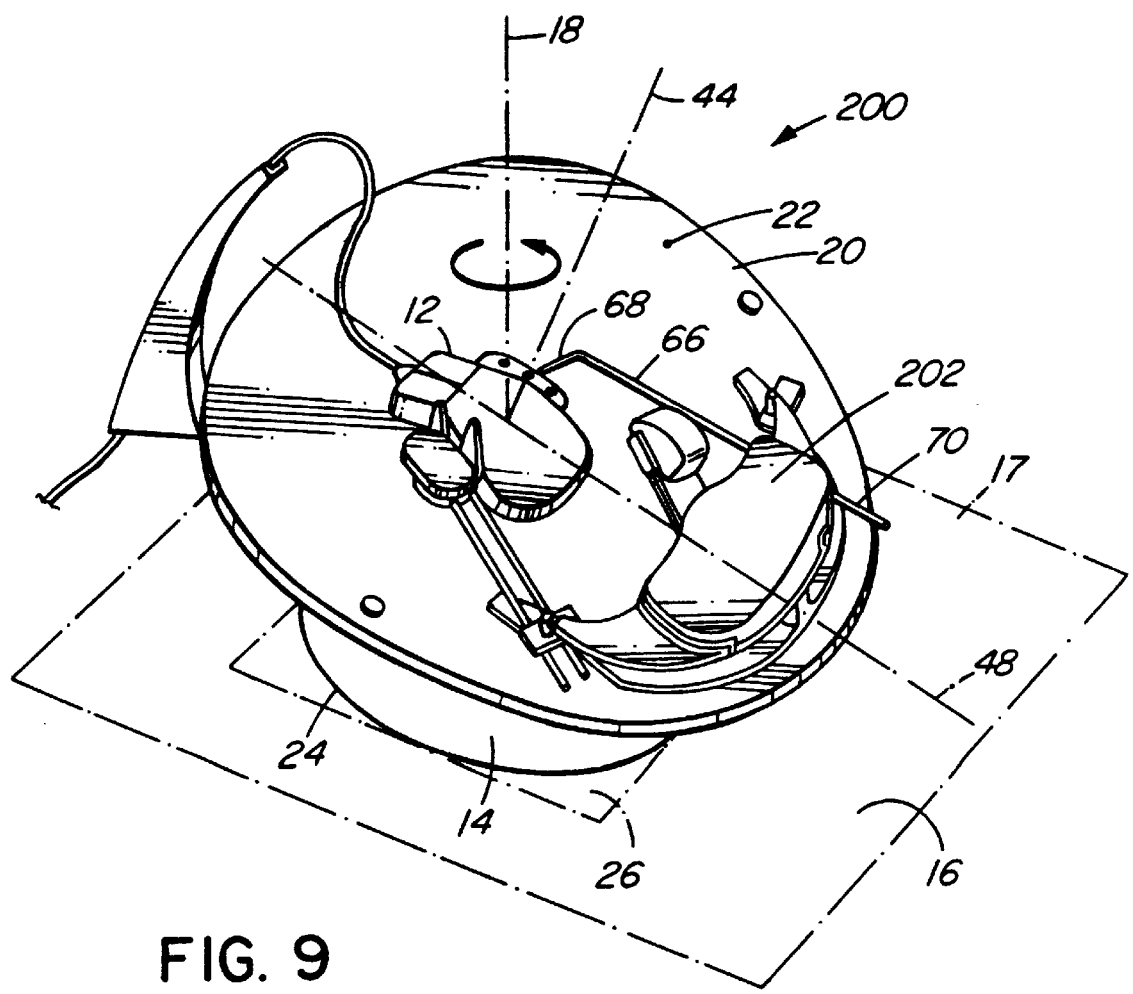
FIG. 9 is a perspective view of an apparatus according to a third embodiment of the invention.

Referring to FIG. 9 a third embodiment of the invention is shown generally at 200. In this embodiment, the wrist support (162) described in connection with the first embodiment is replaced by a hand support apparatus 202. In the following description, items which are similar to items already described in connection with the first embodiment have reference numbers the same as the reference numbers used in the first embodiment. Items which are unique to the third embodiment have numerical references prefixed by the number "2" in the hundreds position.

FIG. 10

Figure 10:
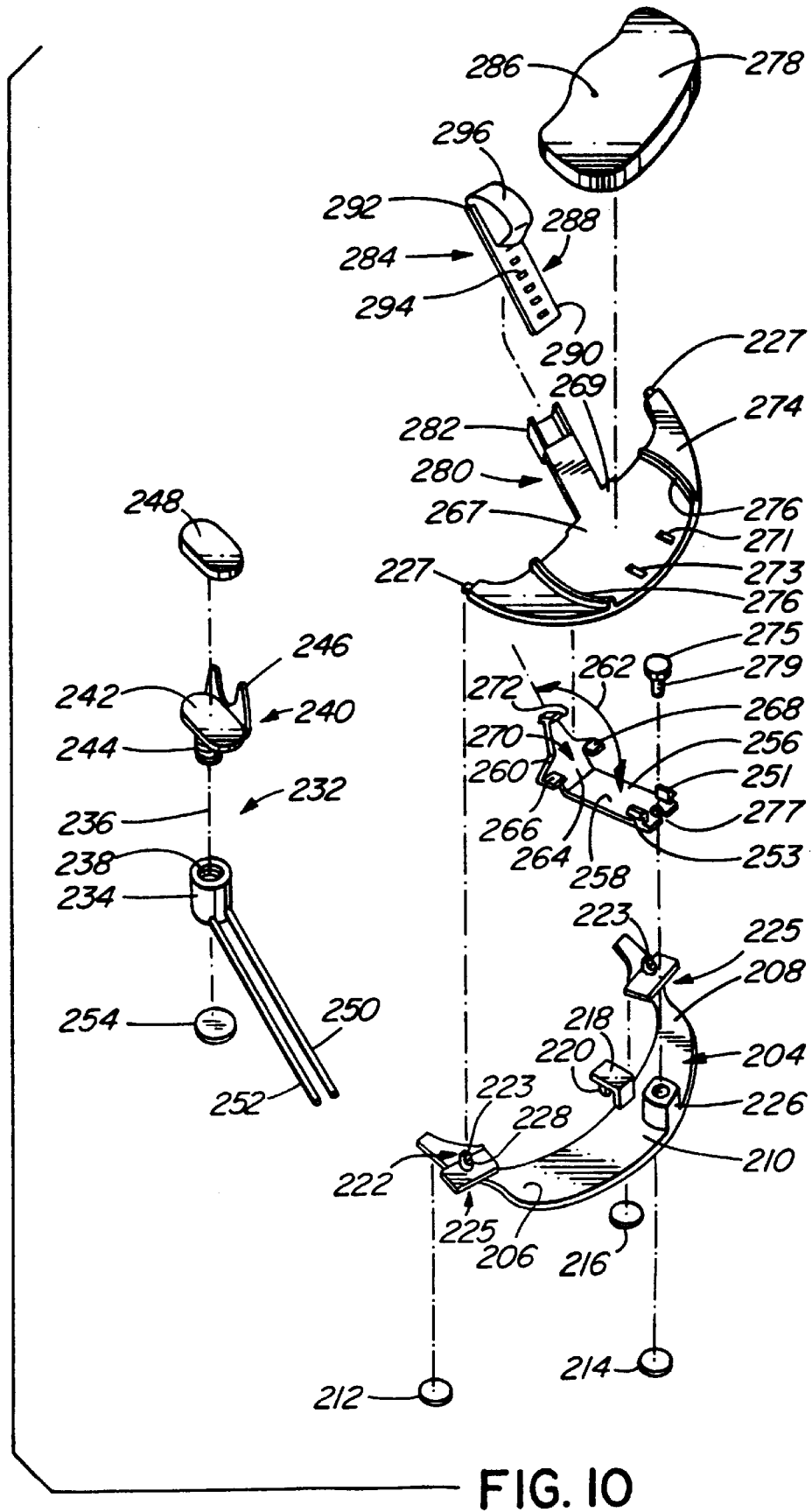
FIG. 10 is an exploded view of a hand support according to the third embodiment.

Referring to FIG. 10, the apparatus according to the third embodiment includes a generally planar arcuate sliding member 204 having first and second leg portions 206, 208 and a central portion 210. First, second and third TEFLON (TRADEMARK) pads 212, 214 and 216 are secured to undersides of the outer extremities of respective leg portions 206 and 208 and to an underside of the central portion 210 respectively and act as skids to provide low friction surfaces for contacting a surface on which the apparatus is to be operated. In the description which follows, it will be assumed that the apparatus will be used on the platform (20) discussed in connection with the first embodiment, however, it will be appreciated that the apparatus may be used by itself on any smooth, low friction surface such as a conventional table top.

FIG. 11

Figure 11:
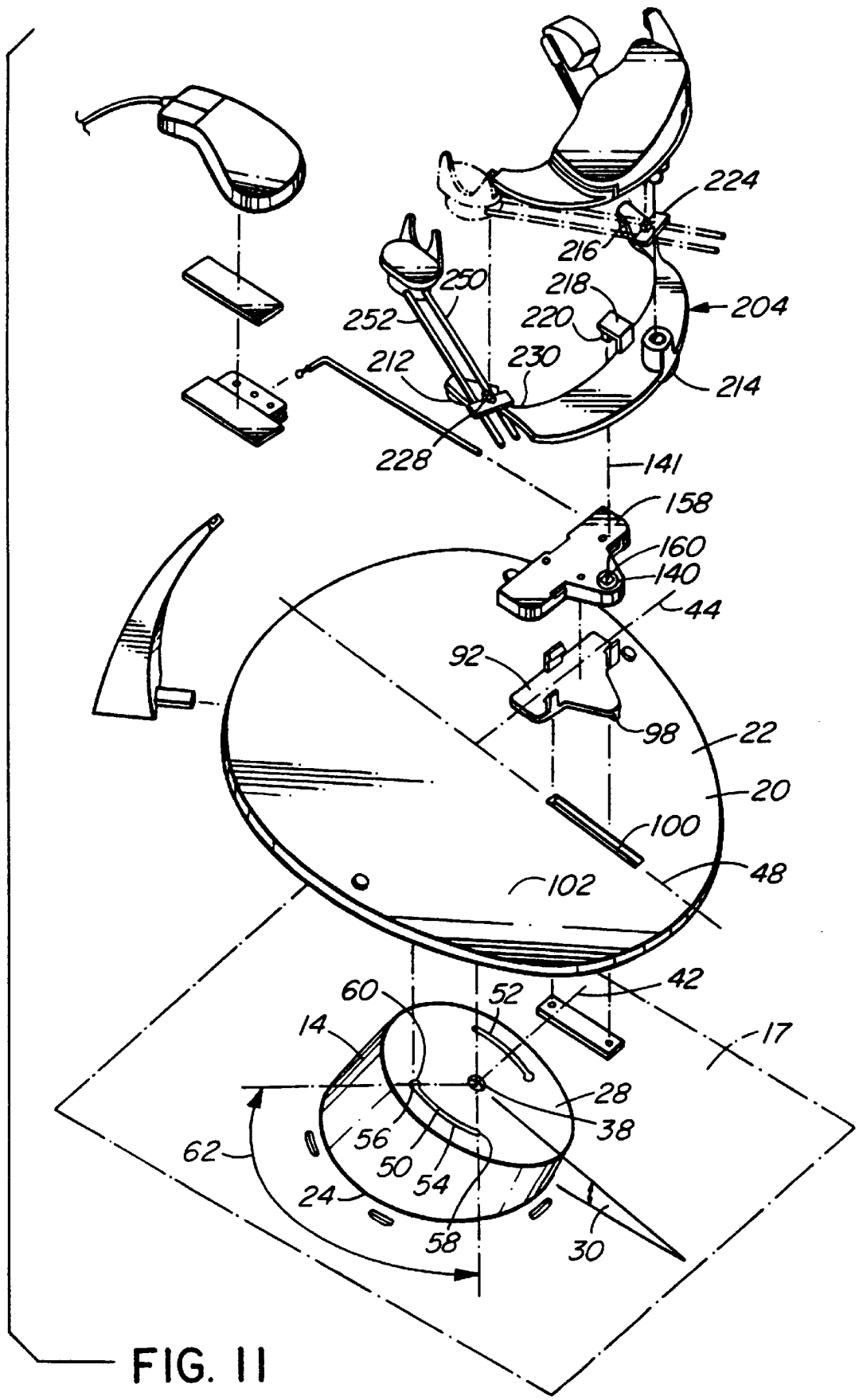
FIG. 11 is an exploded view of the apparatus according to the third embodiment.

Referring to FIG. 11, the arcuate member 204 has a right angled member 218 having a projection 220 with a rectangular cross section complementary to the opening 160 in the spindle 140 such that the projection 220 can be received and held in the opening 160 when the apparatus is to be used with the platform 22 according to the first embodiment. When used on a conventional table top, only apparatus 202 is required.

When used on the platform 22, the right angled member 218 is dimensioned to position the arcuate member 204 such that the first, second and third teflon pads 212, 214 and 216 are in contact with the work surface 22 of the platform 20 when the projection 220 is fully received in the spindle opening 160. Thus, the arcuate member 204 is operable to rotate about the spindle axis 141 with the teflon pads 212, 214 and 216 sliding over the platform surface 22.

Referring back to FIG. 10, the arcuate member 204 has first and second thumb support mounting bosses 222 and 224 disposed on the first and second leg portions 206 and 208 respectively and has a hand support mounting boss 226 disposed on the central portion 210.

The first and second thumb support mounting bosses 222 and 224 are similar and therefore only the first one will be described.

FIG. 12

Figure 12:
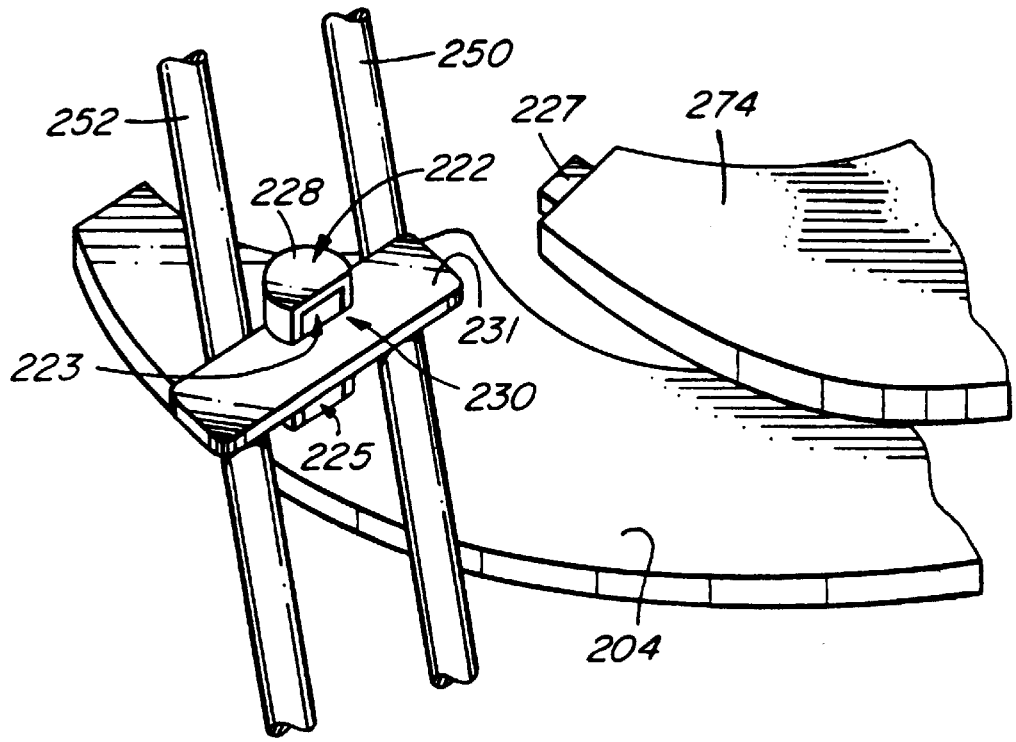
FIG. 12 is an enlarged perspective view of a first mounting boss according to the third embodiment.

Referring to FIG. 12, the first thumb support mounting boss 222 includes a cylindrical projection 228 projecting perpendicular to the plane of the arcuate member 204, which acts as a guide member.

A rectangular slot 230 is formed horizontally in the boss 222 to hold a planar retainer 231 therein, at a horizontal orientation, parallel to and spaced apart from the plane of the arcuate member 204. The cylindrical projection 228 and planar retainer act as a guide holder for holding a thumb support assembly shown generally at 232 in FIG. 10 and prevent the thumb support assembly from separating from the arcuate member 204 should the hand support apparatus 202 be picked up from the platform surface 22. First and second receptacles 223 and 225 are provided in the boss 222, for hingedly holding a tab 227 of an intermediate member 274 described below, at two different elevations.

Referring back to FIG. 10, the thumb support assembly 232 includes a cylindrical, slidable member 234 having an axis 236 and a coaxial threaded opening 238 therein. A thumb rest 240 having a flat head portion 242 and a complementary threaded shank portion 244 extending perpendicular thereto is secured to the cylindrical member using the complementary threaded portions 238 and 244, for supporting a user's thumb during operation of the mouse. Vertical adjustment of the flat head portion 242 is achieved by axial displacement of the thumb rest 240 due to the pitch of the threads when the thumb rest is rotated relative to the cylindrical, slidable member. The threads also allow the thumb rest to pivot relative to the cylindrical slidable member 234 during operation. The thumb rest 240 has a U-shaped guard 246, in this embodiment mounted perpendicular to the flat head portion 242, to contact a side portion of the user's thumb and has a padded portion 248 which acts as a thumb contact member for contacting a bottom portion of the user's thumb (not shown) during use.

Vertical adjustment of the thumb rest 240 is desirable to prevent thumbs of different hand sizes from dropping too far below the heel of the hand, as this would place undue stress on the thumb.

The U-shape of the guard 246 allows some of the flesh of the thumb to extend into an unobstructed space 245 between legs 247 and 249 thereof to permit this flesh to contact the mouse during operation. This allows the user to feel the mouse, thereby receiving tactile feedback and the legs of the guard effectively wrap around the flesh protruding therethrough, which allows the thumb rest to follow the mouse responsively.

The cylindrical member 234 has first and second parallel rods 250 and 252 extending generally radially therefrom, the rods being spaced apart to receive therebetween the first cylindrical projection 228 as seen in FIGS. 11 and 12. This configures the thumb support assembly for right handed operation. The rods 250 and 252 are guided by the cylindrical projection 228 while being allowed to pivot about the cylindrical projection in horizontal and vertical planes. Hence, the thumb rest is moveable relative to the sliding member.

The cylindrical member 234 is fitted with a fourth teflon pad 254 to facilitate sliding movement over the surface of the platform.

It will be appreciated that the first and second rods 250 and 252 may be installed to cooperate with the second mounting boss 224, whereby the second cylindrical projection is received between the first and second rods, in which case the apparatus is considered to be configured for left-handed operation as shown in broken outline in FIG. 11.

Referring back to FIG. 10, to the hand support mounting boss 226 is secured a lock member 256, by a thumbscrew 275. The lock member has a first portion 258 positioned generally parallel to the plane of the arcuate member 204, and has an opening 277 and first and second tabs 251 and 253 projecting upwardly on opposite sides of the opening 277. A threaded shaft portion 279 of the thumbscrew 275 is passed through the opening 277 and is received and threadedly engaged in the mounting boss 226 to secure the lock member to the mounting boss.

The lock member 256 further includes a second portion 260 angularly disposed at an approximately 135 degree angle 262 to the first portion 258. The second portion 260 has a flat portion 264 and a pair of retaining tabs 266, 268 which define an area 270 adjacent the flat portion 264. The flat portion is terminated in an angled extending tab 272 which extends out of the plane of the flat portion 264.

The intermediate member 274 is connected to the arcuate member 204 by the tabs 227 received in respective receptacles 223 or 225 and is connected to the lock member 256 by tabs 251 and 253 received in respective slots 271 and 273 in the intermediate member. Retaining tabs 266 and 268 on the lock member 256 further cooperate with shoulder areas 267 and 269 to secure the intermediate member 274 to the lock member 256, as seen best in FIG. 13. Referring back to FIG. 10, it will be appreciated that tabs 227 may be received in respective receptacles 223 and 225 and that it would be possible to incline the intermediate member relative to the arcuate member 204 by causing the tab 227 near the thumb support assembly to be received in the upper receptacle 223 of the first boss 222 and the opposite tab 227 in the lower receptacle 225 of the second mounting boss 224. This may enhance the comfort afforded to some users.

The intermediate member has retaining ridges 276 for retaining a heel support 278 thereon and has an upwardly projecting portion 280 having a guide 282 for receiving and holding a palm support member 284.

The heel support 278 has a contoured surface 286 for comfortably supporting the heel of a user's hand and has conventional retaining tabs (not shown) for cooperating with the retaining ridges 276 for securing the heel support to the intermediate member 274.

The palm support member 284 has a flat rectangular tongue portion 288. The tongue portion has first and second end portions 290, 292 the first end portion having a plurality of rectangular openings therein and being received in the guide 282 on the intermediate member 274. The second end portion 292 has a palm pad 296 for comfortably contacting and supporting the palm of a user of the device.

FIG. 13

Figure 13:
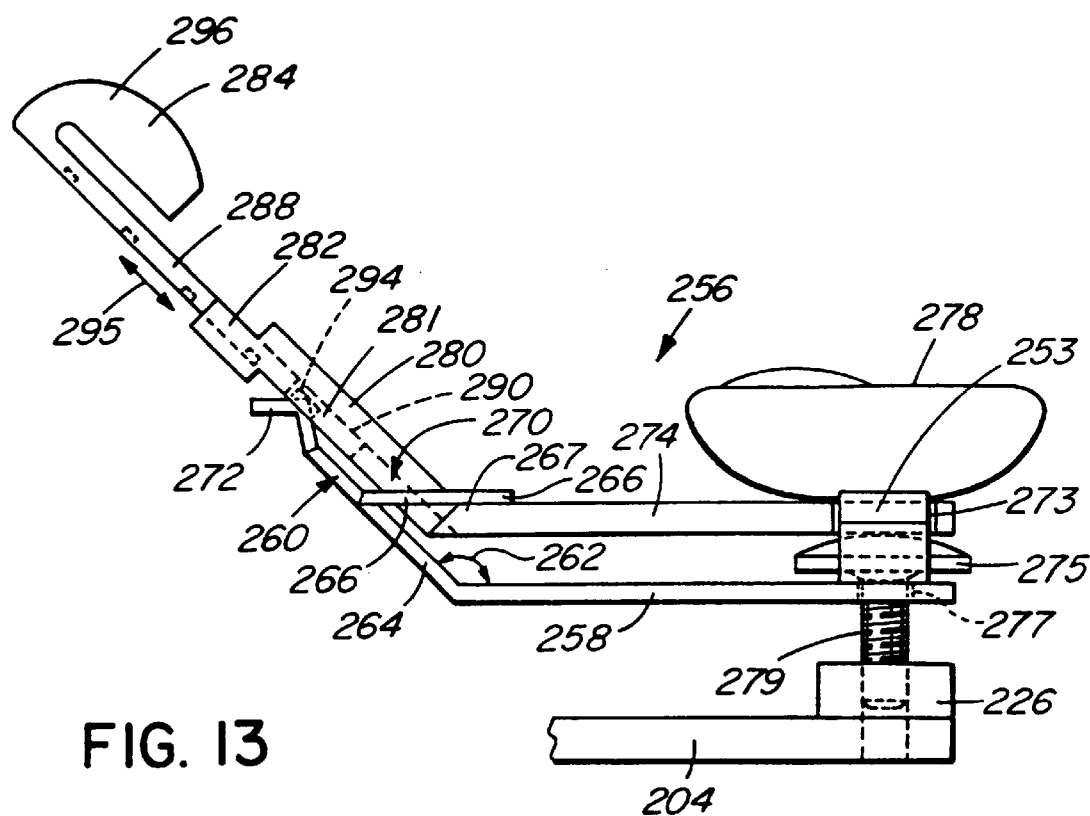
FIG. 13 is a fragmented side view of the apparatus according to the third embodiment.

Referring to FIG. 13, the guide 282 guides the first end portion 290 into the rectangular area 270 defined by the retaining tabs 266 (and 268) and the tab 272 is received in one of the openings 294 to retain the palm pad 296 at a desired distance from the heel support 278. The distance of the palm pad 296 from the heel support 278 may be adjusted by prying the perpendicularly extending tab 272 out of an opening 294, sliding the first end portion 290 inwardly or outwardly relative to the guide 282, in the direction indicated by arrow 295, and permitting the extending tab 272 to be received in another opening 294 to lock the palm pad at a new distance from the heel support 278.

The palm support is adjustable in height relative to the heel support 278 to accommodate different hand sizes. The slope a given hand makes with the wrist support when resting at a given site on the palm support is determined by the height of the palm support above the wrist support. Adjustability of this height allows the user to adjust the apparatus to provide an optimum slope of the hand, relative to the forearm.

The adjustable height of the palm support is used to provide coarse fore-aft pitch adjustment to comfortably accommodate hands of various sizes while the thumbscrew 275 permits fine adjustment of the fore-aft pitch.

Figure 14:
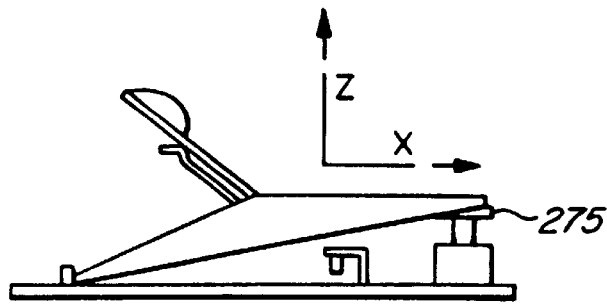
FIG. 14 is a simplified side view of the apparatus according to the third embodiment of the invention, with the apparatus adjusted to exhibit zero pitch.
Figure 15:
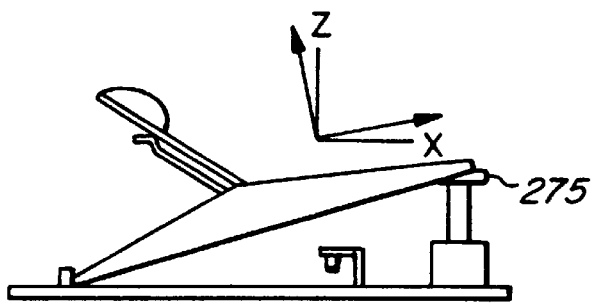
FIG. 15 is a simplified side view of the apparatus according to the third embodiment of the invention, with the apparatus adjusted to exhibit positive pitch.
Figure 16:
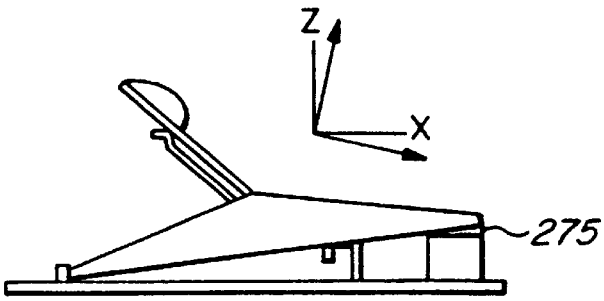
FIG. 16 is a simplified side view of the apparatus according to the third embodiment of the invention, with the apparatus adjusted to exhibit negative pitch.

FIGS. 14, 15 and 16

FIG. 14 shows the apparatus with zero pitch, FIG. 15 shows it with positive pitch and FIG. 16 shows it with negative pitch. The adjustability of pitch allows a user to adjust the apparatus to compensate for the difference in height between the work surface upon which the mouse is to be used and the natural position of the user's hand. The thumbscrew 275 permits fine pitch adjustment to allow the user to adjust the apparatus to the desired amount of pitch for optimum comfort.

Operation

FIG. 17

Figure 17:
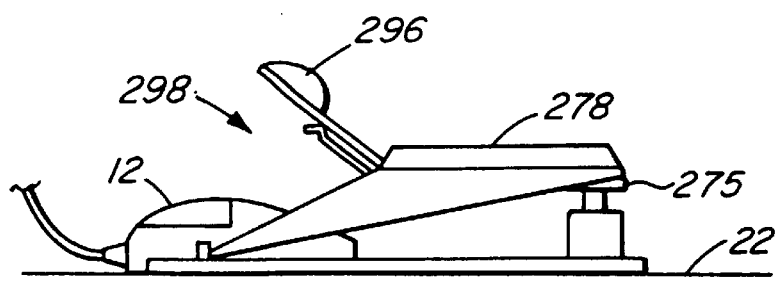
FIG. 17 is a simplified side view of the hand support according to the third embodiment.

Referring to FIG. 17, the palm pad 296 thus extends upwardly from the heel support 278 and is operable to support the palm of the user's hand (not shown) above the work surface 22. This creates a mouse operating space 298 between the palm pad 296 and the work surface 22, the mouse operating space 298 being operable to receive the computer mouse 12 therein.

FIG. 18

Figure 18:
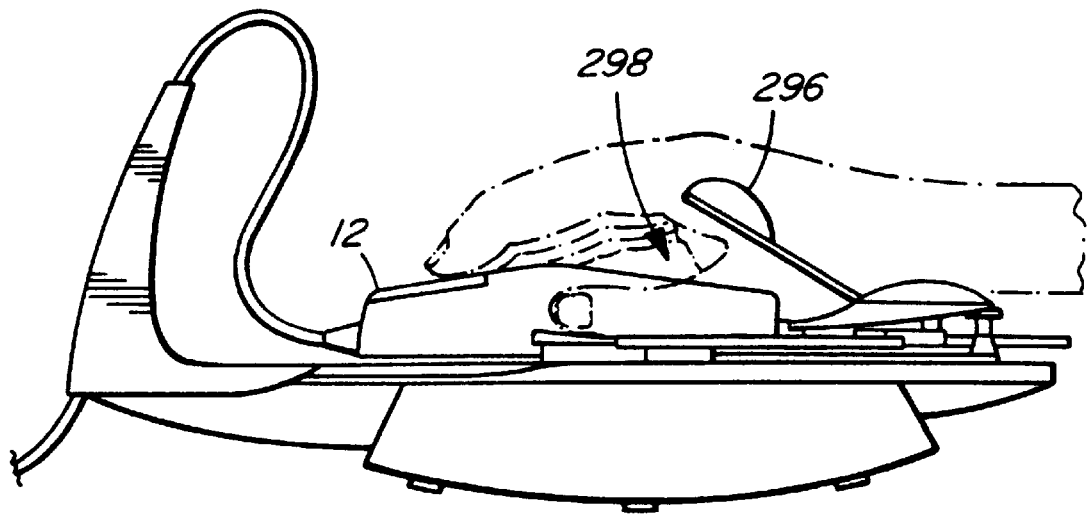
FIG. 18 a side view of the apparatus according to the third embodiment shown in use on a platform according to the first embodiment.

Referring to FIG. 18, with the computer mouse 12 in the mouse operating space 298, the user can rest the heel of his hand (not shown) on the heel support 278 and rest his palm on the palm pad 296 which positions the hand above the mouse operating space 298. The palm pad 296 is dimensioned to contact only the palm of the hand such that the user's fingers can drape downwardly toward the platform surface to grip the mouse.

FIG. 19

Referring to FIG. 19, the arcuate member 204 is dimensioned to permit some side to side movement of the mouse between the first and second leg portions 206 and 208 which allows the user to make incremental mouse movements by moving the fingers only, thus eliminating the need to move the whole hand or the arm. This has the effect of reducing stress on the main muscles in the user's arm. Large mouse movements can still be accomplished by moving the entire hand support apparatus as rotational movement of this apparatus is permitted by the spindle (140 in FIG. 11) and linear movement is provided by the cooperation of the rectangular projection (98 in FIG. 11) in the rectangular slot (100 in FIG. 11) in the platform 20 when the hand support apparatus is used on the platform.

When the hand support apparatus is used on a conventional table top, of course, the counterbalance components are not used and only the apparatus seen in FIG. 10 is used. In this application, conventional hand and arm movements can be used to make large mouse movements while only movement of the fingers is required to make incremental mouse movements.

Fourth Embodiment

Figure 20:
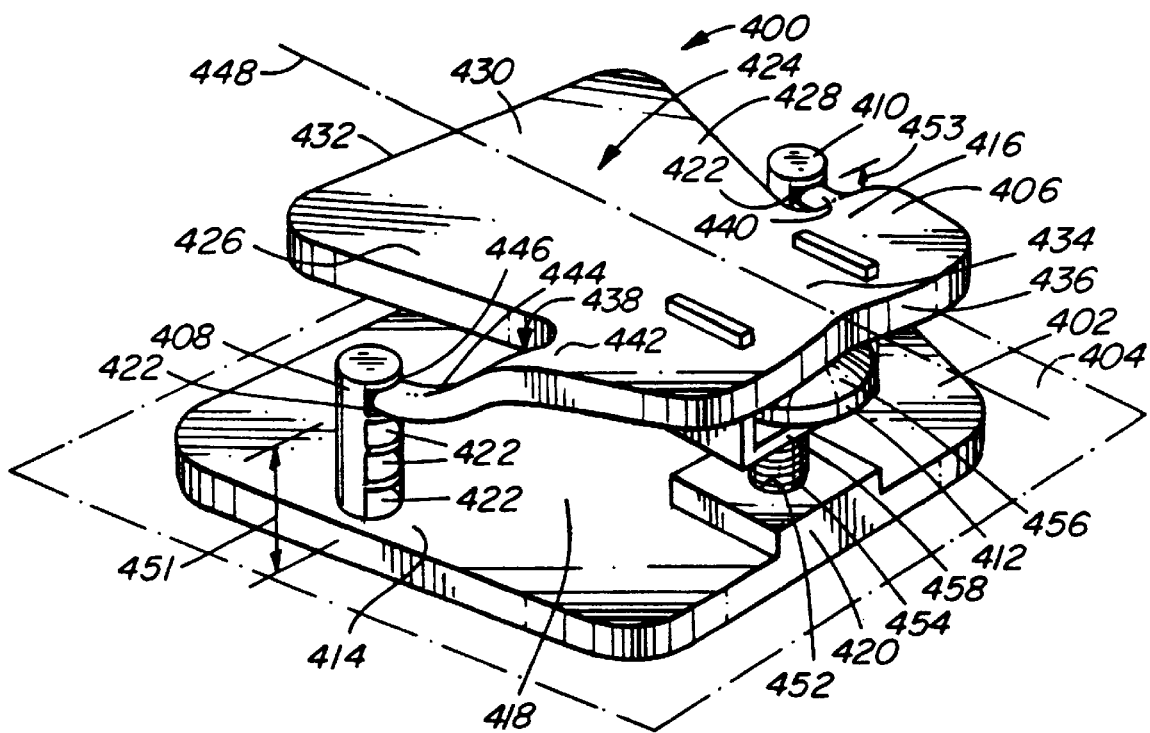
FIG. 20 is an isometric view of an apparatus according to a fourth embodiment of the invention.

Referring to FIG. 20 a moveable hand support apparatus according to a fourth embodiment of the invention is shown generally at 400. This apparatus is particularly adapted to allow a user to use the apparatus alternatively with a mouse and keyboard without lifting the hand off of the apparatus when switching from the mouse to the keyboard and vice-versa.

The apparatus includes a sliding member 402 operable to rest and slide on a low-friction work surface 404 and a heel support 406 connected to the sliding member 402, for supporting the heel of the user's hand above the work surface 404. The heel support 406 is connected to the sliding member 402 by first and second support posts 408 and 410 and an adjustable connector 412.

The sliding member 402 has first and second opposite side portions 414 and 416 and a main body portion 418 having a rear portion 420. The first and second spaced apart leg portions 414 and 416 prevent the sliding member 402 from tipping due to the weight of the user's hand.

The first and second support posts 408 and 410 are connected to the first and second leg portions 414 and 416 respectively and extend upwardly, generally at right angles thereto. The first and second support posts 408 and 410 each have a plurality of receptacles 422 disposed at different distances from the sliding member 402.

The heel support 406 includes a main body portion 424 having first and second opposite side portions 426 and 428, a forward end portion 430 having a forward edge 432 and a rearward end portion 434 having rearward edge 436. The first and second opposite side portions 426 and 428 have first and second tabs 438 and 440 respectively, each of which has a first planar portion 442, an angled portion 444 and a second planar portion 446, all extending generally parallel to a longitudinal axis 448 of the heel support 406. The first and second support posts are disposed on the sliding member 402 such that they are approximately half-way between the forward edge 432 and the rearward edge 436 such that the second planar portions 446 are operable to be received and held in receptacles 422 in the first and second support posts 408 and 410 respectively.

To the rearward end portion 434 of the heel support 406 is secured an adjustable connector 412 extending between the rearward end portion 434 and the sliding member rear portion 420 for supporting the rearward end portion 434 above the sliding member rear portion 420 at a plurality of different distances thereabove. The adjustable connector 412 includes a screw-threaded portion 452 on the sliding member rear portion 420 and a screw member 454 having a captive portion 456 pivotally connected to the heel support 406 and a threaded portion 458 operable to engage with the screw threaded portion 452 on the sliding member 402. Rotation of the screw member 454 causes the support rear portion 434 to move toward or away from the sliding member rear portion 420 thereby adjusting the fore-aft pitch of the heel support 406 relative to the sliding member 402. The rearward end portion 434 is thus supportable above the sliding member rear portion 420 at a plurality of different distances. The adjustable connector 412 and cooperating structure thus act as fore-aft pitch adjusting means for adjusting fore-aft pitch of the heel support 406 relative to the sliding member 402. Alternatively, the adjustable connector and associated structure may be disposed at approximately the same position as the tabs shown in FIG. 20 and the tabs and first and second support posts shown in FIG. 20 may be disposed a the location of the adjustable connector and associated structure shown in FIG. 20.

Side-to-side pitch adjustability is provided by the cooperation between the first and second tabs 438 and 440 on the heel support 406 and the various receptacles 422 in the first and second support posts 408 and 410. The side to side pitch of the heel support 406 is adjusted by placing the second planar portion of the first tab 438 in a receptacle 422 in the first support post 408 disposed at a first distance 451 from the sliding member 402 and placing the second planar portion of the second tab 440 in a receptacle 422 in the second support post 410 disposed at a second distance 454 from the sliding member 402. The first and second support posts 408 and 410, receptacles 422 and first and second tabs 438 and 440 thus act as side to side pitch adjusting means for adjusting side to side pitch of the heel support 406 relative to the sliding member 402.

Figure 21:
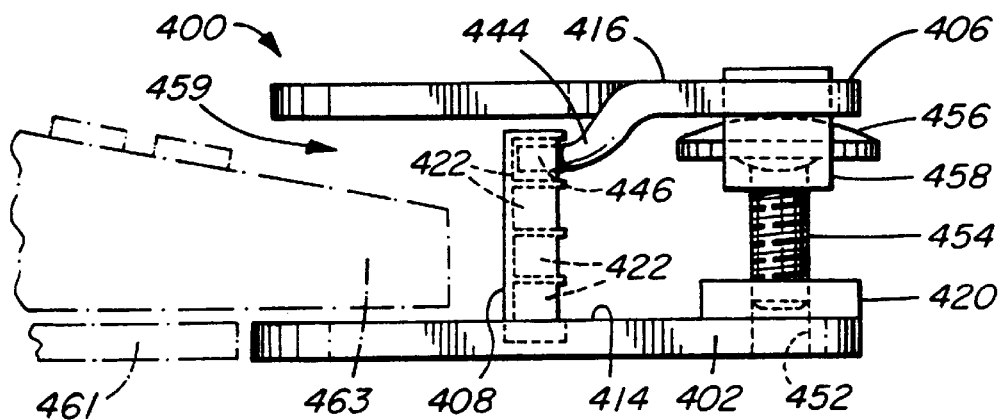
FIG. 21 is a side view of the apparatus shown in FIG. 20 shown in use with a conventional computer keyboard.

Referring to FIG. 21, the support posts 408 and 410 and the adjustable connector 421 also act as spacing means for spacing the heel support from the sliding member such that a generally planar space 459 is formed between at least portions of the heel support 406 and the sliding member 402.

By positioning a conventional computer keyboard on a spacing platform 461 and cantilevering a portion 463 of the computer keyboard from the spacing platform, the planar space 459 is operable to receive therein the cantilevered portion 463, which allows a user to place a hand on the heel support 406 and alow the fingers to extend thereover for contact with the keyboard keys. This positions the user's hand such that the hand is relatively level, while the fingers drop down to reach the keys of the keyboard.

Figure 22:
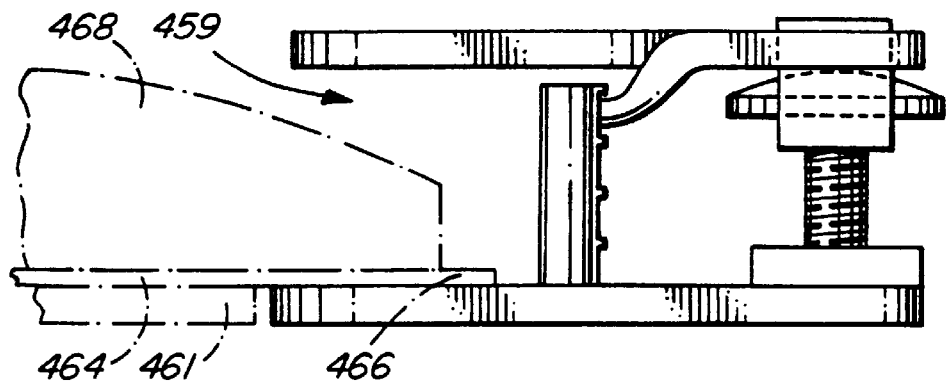
FIG. 22 is a simplified side view of the apparatus shown in FIG. 20 shown in use with a conventional computer mouse.

Referring to FIG. 22, a conventional rigid mouse pad 464 may be placed on the platform 461 such that a cantilevered portion 466 extends therefrom and a conventional computer mouse 468 may be placed on the pad and retracted into he planar space 459 by grasping the mouse with the thumb and fourth finger, while the hand is supported in a generally level position by the heel support 406. The index and middle fingers can then drape downwardly to operate the mouse buttons.

This embodiment is best for applications where keyboard usage is more intensive than mouse usage but alternate usage between a keyboard and a mouse is required. The user may keep his hand on the heel support 406 and without removing the hand from the heel support, slide the apparatus on the work surface 404 alternately between a keyboard and a mouse. This reduces fatigue in the hand both during use and when switching from the keyboard to the mouse and vice versa.

Fifth Embodiment

Figure 23:
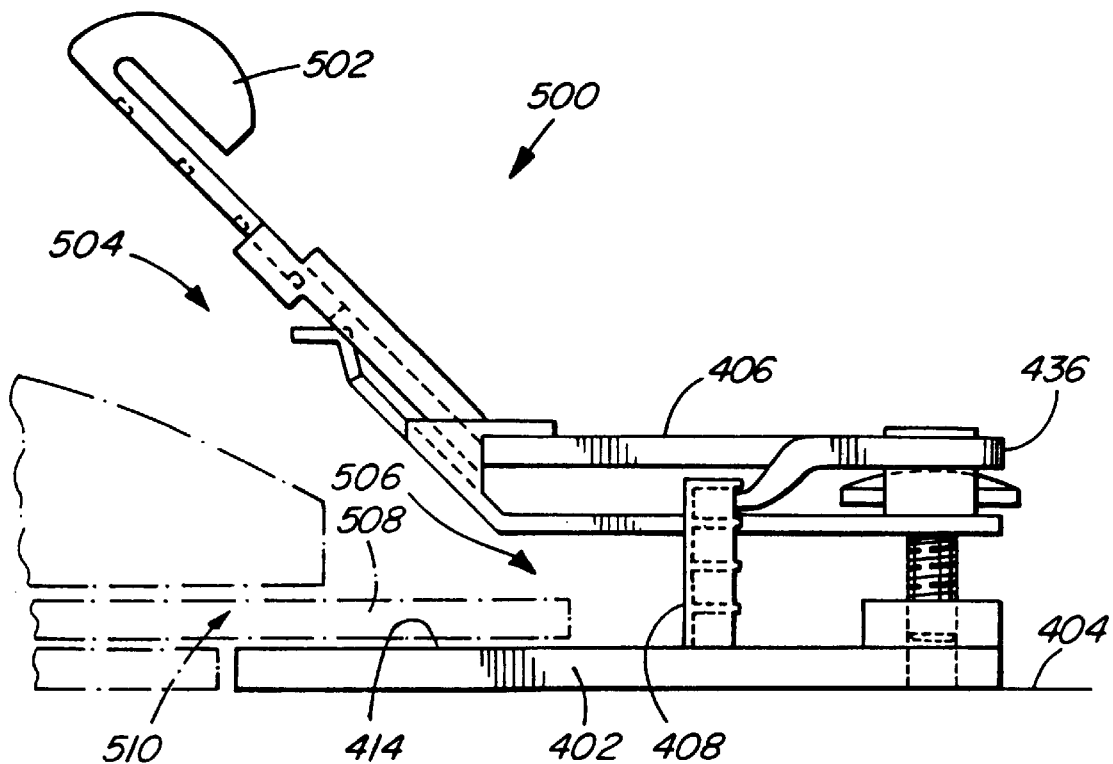
FIG. 23 is a side view of an apparatus according to a fifth embodiment of the invention.

Referring to FIG. 23, an apparatus according to a fifth embodiment of the invention is shown generally at 500. This apparatus is somewhat of a hybrid between the apparatus according to the fourth embodiment and the apparatus shown in FIG. 13. It differs from the apparatus according to the fourth embodiment in that it includes a palm support 502. Numerical references relating to structure common to the fourth and fifth embodiments are as defined in connection with the fourth embodiment.

In the present embodiment, the palm support 502 is connected to the sliding member 402 by the heel support 406 and extends upwardly from the heel support to support the palm of the user's hand above the work surface 404. The palm support 502 and the work surface 404 define a mouse operating space 504 in which a conventional computer mouse 505 may be received.

The apparatus differs from that shown in FIG. 13 in that the body portion is sold, although it may have first and second leg portions such as shown at 204 and 206 in FIGS. 10 and 11, and the first and second support posts, only one of which is shown at 408, are disposed aft of the palm support 502 as far as possible such that a generally planar space 506 is formed between at least portions of the heel support 406 and the sliding member 402. Preferably, the planar space 506 extends far toward the rearward edge 436 of the heel support 406 so as to permit a cantilevered portion 508 of a rigid mouse pad 510 to be substantially received therein. Similarly, a cantilevered portion of a keyboard (not shown) may be received in the mouse operating space and planar space. The apparatus thus provides the planar space 506 for receiving the cantilevered portion of either a mouse pad or a keyboard and defines a mouse operating space in which a mouse can be manipulated by the fingers of a user's hand while the hand is positioned such that the user's palm is supported by the palm support. This embodiment is therefore best for applications where mouse usage is more intensive than keyboard usage but alternate usage between a keyboard and a mouse is required.

The apparatus according to the fourth or fifth embodiments may further include a counterbalance similar to that shown and described in connection with FIG. 7, Preferably, the counterbalance is connected to the sliding member. The counter balance provides a force to a computer mouse in the mouse operating space to maintain the mouse in a stationary position when the apparatus is used on an inclined surface. The counterbalance includes an arm having a first portion securable to the computer mouse and a second portion secured to the sliding member for pivotal and linear movement relative thereto. A guide member is pivotally connected to the support member for receiving, holding and guiding the second end portion of the arm in linear movement relative thereto and a spring is connected between the guide member and the sliding member for imposing a counterbalancing torque on the arm to provide the force to the computer mouse. The extension of the spring is adjustable to vary the counterbalancing torque, the adjustability being provided by a toothed wheel rotatably secured to the sliding member and a pawl member biased against the toothed wheel to resist rotation thereof, the spring being connected to the wheel such that rotation of the wheel is operable to adjust the extension of the spring.

While specific embodiments of the invention have been described and illustrated, such embodiments should be considered illustrative of the invention only and not as limiting the invention as construed in accordance with the accompanying claims.

What is claimed is:

1. A moveable hand support comprising:
    a) a sliding member operable to rest and slide on a work surface, said sliding member having first and second opposite side portions and a main body portion;
    b) first and second support posts connected to respective first and second opposite side portions of said sliding member;
    c) a heel support, having first and second opposite side portions and a main body portion, said first and second side portions having respective portions connectable to said first and second support posts respectively at various distances from said sliding member;
    d) a connector pivotally connected between said main body portion of said heel support and said main body portion of the sliding member, whereby said respective portions of said first and second side portions of said heel support and said connector cooperate to position said heel support above said sliding member such that said respective portions may be connected to said first and second support posts respectively, at different distances from said sliding member to impart side-to-side pitch adjustment of said heel support relative to said sliding member; and
    e) a palm support connected to said sliding member and extending upwardly from said heel support for supporting the palm of the user's hand above said work surface such that a mouse operating space is provided between said palm support and said work surface, said operating space being operable to receive a computer mouse therein, said palm support being dimensioned to permit the user's fingers to extend into said mouse operating pace to enable the fingers of said user to grip said computer mouse.

2. An apparatus as claimed in claim 1 further including a plurality of receptacles disposed in said first and second support posts for receiving said respective portions of said heel support, each of said receptacles being disposed at a different distance from said sliding member.

3. An apparatus as claimed in claim 2 wherein said reel support includes first and second tabs dispose on said first and second opposite side portions of said heel support, respectively, said first and second tabs being operable to be received in respective receptacles in said first and second support post.

4. An apparatus as claimed in claim 3 wherein said first tab is disposed in a receptacle in said first support post at a first distance from said sliding member and said second tab is disposed in a receptacle in said second support post at a second distance from said sliding member.

5. An apparatus as claimed in claim 1 wherein said heel support has a forward edge and a rearward edge and said first and second support posts are disposed on said sliding member in a position such that a space is formed between said forward edge of said heel support and said sliding member.

6. An apparatus as claimed in claim 5 wherein said sliding member, said heel support and said first and second support posts are dimensioned such that said space is operable to receive a portion of a computer keyboard therein.

7. An apparatus as claimed in claim 1 wherein said sliding member and said heel support have respective rear portions and wherein said connector includes a screw-threaded portion on said sliding member and a screw member having a captive portion pivotally connected to said heel support and a threaded portion operable to engage with said screw threaded portion on said sliding member, such that rotation of said screw member causes said heel support rear portion to move toward or away from said sliding member rear portion thereby adjusting the fore-aft pitch of said heel support relative to said sliding member.

8. An apparatus as claimed in claim 1 wherein said palm support is operable to be positioned at various distances relative to said heel support.

9. An apparatus as claimed in claim 8 further including a lock member secured to said sliding member, said lock member having retaining tabs for securing said palm support thereto in sliding engagement to permit a distance between said palm support and said heel support to be adjustable to suit the user, said lock member cooperating with said palm support to lock said palm support at a desired distance.

10. An apparatus as claimed in claim 1 wherein said heel support has a forward edge and a rearward edge and said first and second support posts are disposed approximately half way between said forward edge and said rearward edge on the sliding member such that a space is formed between said forward edge of said heel support and said sliding member.

11. An apparatus as claimed in claim 10 wherein said sliding member, said heel support and said first and second support posts are dimensioned such that said space is operable to receive a portion of a computer keyboard therein.

* * * * *